US012687124B2

(12) United States Patent
Collins et al.

(10) Patent No.: US 12,687,124 B2
(45) Date of Patent: Jul. 21, 2026

(54) ELECTRICALLY POWERED CATALYST HEATER FOR FLUID TREATMENT SYSTEMS

(71) Applicant: CORNING INCORPORATED, Corning, NY (US)

(72) Inventors: Thomas Adam Collins, Bradford, NY (US); David Robert Heine, Seminole, FL (US); Avinash Tukaram Shinde, Irving, TX (US)

(73) Assignee: CORNING INCORPORATED, Corning, NY (US)

(*) Notice: Subject to any disclaimer, the term of this patent is extended or adjusted under 35 U.S.C. 154(b) by 30 days.

(21) Appl. No.: 18/034,220

(22) PCT Filed: Nov. 22, 2021

(86) PCT No.: PCT/US2021/060253

§ 371 (c)(1),
(2) Date: Apr. 27, 2023

(87) PCT Pub. No.: WO2022/115349

PCT Pub. Date: Jun. 2, 2022

(65) Prior Publication Data

US 2023/0392528 A1 Dec. 7, 2023

Related U.S. Application Data

(60) Provisional application No. 63/119,029, filed on Nov. 30, 2020.

(51) Int. Cl.

*F01N 3/20* (2006.01)
*F01N 3/10* (2006.01)

(Continued)

(52) U.S. Cl.

CPC ............. *F01N 3/2013* (2013.01); *F01N 3/10* (2013.01); *F01N 3/2828* (2013.01); *H05B 3/10* (2013.01);

(Continued)

(58) Field of Classification Search

CPC ........ F01N 3/2013; F01N 3/10; F01N 3/2828; F01N 2240/16; F01N 2330/06;

(Continued)

(56) References Cited

U.S. PATENT DOCUMENTS

| | | | | | |
|---|---|---|---|---|---|
| 4,576,800 | A * | 3/1986 | Retallick | B01J 35/56 | 502/527.22 |
| 4,882,130 | A * | 11/1989 | Asai | B01J 19/32 | 428/116 |

(Continued)

FOREIGN PATENT DOCUMENTS

| | | |
|---|---|---|
| CN | 1354320 A | 6/2002 |
| EP | 0661421 B1 | 11/1998 |

(Continued)

OTHER PUBLICATIONS

International Search Report and Written Opinion of the International Searching Authority; PCT/US2021/060253; mailed on Mar. 18, 2022, 11 pages; European Patent Office.

(Continued)

*Primary Examiner* — Matthew T Largi
(74) *Attorney, Agent, or Firm* — Irene L. Brookins

(57) ABSTRACT

A heater assembly including a heater body having a monolithic honeycomb structure comprising a plurality of intersecting walls. The walls have a thickness and extend in an axial direction to form a plurality of cells of the honeycomb structure that extend axially from a first end face to a second end face. A first electrode is coupled to the heater body. A second electrode is coupled to the heater body. A current- (Continued)

carrying path is defined over the walls between the first electrode and the second electrode. A plurality of openings extend through the thickness of at least some of the walls. A fluid treatment system, method of treating a fluid, and method of manufacturing a heater assembly are also disclosed.

16 Claims, 4 Drawing Sheets

(51) Int. Cl.
*F01N 3/28* (2006.01)
*H05B 3/10* (2006.01)

(52) U.S. Cl.
CPC ...... *F01N 2240/16* (2013.01); *F01N 2330/06* (2013.01); *F01N 2330/34* (2013.01)

(58) Field of Classification Search
CPC ............. F01N 2330/34; F01N 2330/38; F01N 3/2026; H05B 3/10
See application file for complete search history.

(56) References Cited

U.S. PATENT DOCUMENTS

| | | | | |
|---|---|---|---|---|
| 4,987,034 | A * | 1/1991 | Hitachi | F01N 3/281 502/527.22 |
| 5,393,586 | A | 2/1995 | Lipp | |
| 5,436,216 | A * | 7/1995 | Toyao | F01N 3/2821 502/527.22 |
| 5,514,347 | A * | 5/1996 | Ohashi | F01N 3/027 422/174 |
| 5,597,503 | A * | 1/1997 | Anderson | F01N 3/2026 422/174 |
| 5,633,066 | A | 5/1997 | Lipp et al. | |
| 5,649,049 | A * | 7/1997 | Abe | F01N 3/2807 422/174 |
| 5,888,456 | A | 3/1999 | Hashimoto et al. | |
| 6,887,067 | B2 * | 5/2005 | Griffin | F23C 13/00 431/9 |
| 7,030,059 | B2 * | 4/2006 | Tanabe | B01J 35/56 502/527.22 |
| 7,083,860 | B2 * | 8/2006 | Maus | B01J 35/56 502/527.22 |
| 7,727,498 | B2 * | 6/2010 | Hodgson | F01N 3/0222 423/210 |
| 2002/0060992 | A1 | 5/2002 | Endo | |
| 2020/0230586 | A1 * | 7/2020 | Fujimura | B01J 35/40 |

FOREIGN PATENT DOCUMENTS

| | | | |
|---|---|---|---|
| EP | 3666377 | A1 | 6/2020 |
| WO | 00/53904 | A1 | 9/2000 |
| WO | 2007/010985 | A1 | 1/2007 |

OTHER PUBLICATIONS

Chinese Patent Application No. 202180080003.9 , Office Action dated Jun. 14, 2025, 5 pages (English Translation only), Chinese Patent Office.

* cited by examiner

ELECTRICALLY POWERED CATALYST HEATER FOR FLUID TREATMENT SYSTEMS

This is a national stage application under 35 U.S.C. § 371 of International Application No. PCT/US2021/060253, filed on Nov. 22, 2021, which claims the benefit of priority under 35 U.S.C. § 119 of U.S. Provisional Application Ser. No. 63/119,029 filed on Nov. 30, 2020, the content of which is relied upon and incorporated herein by reference in their entireties.

BACKGROUND

1. Field

This disclosure relates to fluid treatment systems, such as exhaust aftertreatment systems, and more particularly heater assemblies to aid in the treatment of fluids, such as electrically powered heaters useful for activating catalysts in exhaust aftertreatment systems.

2. Technical Background

Some fluid treatment systems, such as engine exhaust aftertreatment systems, may benefit from additional heat supplied from a supplemental heater. Examples of such systems include electrically heated catalyst (EHC) systems that have an electrically powered heater useful to quickly achieve temperatures sufficient to initiate activation of a catalyst material in the aftertreatment of engine exhaust.

SUMMARY

In some embodiments, a heater assembly comprises a heater body comprising a monolithic honeycomb structure comprising a plurality of intersecting walls, wherein the walls have a thickness and extend in an axial direction to form a plurality of cells of the honeycomb structure that extend axially from a first end face to a second end face; a first electrode coupled to the heater body; a second electrode coupled to the heater body, wherein a current-carrying path is defined over the walls between the first electrode and the second electrode; and a plurality of openings that extend through the thickness of at least some of the walls.

In some embodiments, the heater assembly further comprises a plurality of insulating slots that each extend laterally across at least a portion the heater body and disrupt the current-carrying path.

In some embodiments, the insulating slots are formed by an absence of the intersecting walls along the slots.

In some embodiments, the openings comprise a shape having an upstream side and a downstream side, relative to a flow of gas through the heater body, wherein a first lateral dimension of the upstream side is wider than a second lateral dimension of the downstream side.

In some embodiments, the openings comprise a shape having a larger flow area in an upstream axial half proximate to an upstream side of the shape than in a downstream axial half proximate to a downstream side of the shape.

In some embodiments, the openings each comprise a shape having a tapered end.

In some embodiments, the tapered end is at a downstream side of the shape, relative to a flow of gas through the heater body.

In some embodiments, the tapered is triangular, trapezoidal, semi-circular, or semi-ellipsoidal.

In some embodiments, the shape comprises a rectangular portion at the upstream end and a triangular portion at the downstream end.

In some embodiments, the shape is pentagonal.

In some embodiments, the channels have a cross-sectional shape enclosed by a plurality of web portions of the walls, each web portion extending between intersections between the walls.

In some embodiments, a cross-sectional shape of the cells is square.

In some embodiments, each cell is enclosed by a plurality of segments of the intersecting walls, and wherein the heater body comprises at least one of the openings in each segment of the walls.

In some embodiments, each cell is enclosed by a plurality of segments of the intersecting walls, and wherein the heater body comprises a plurality of the openings in at least some of the segments of the walls that enclose each of the cells.

In some embodiments, at least some of the segments comprise a row of at least two of the openings.

In some embodiments, at least some of the segments comprise a column of the openings axially-spaced along the segment.

In some embodiments, at least some of the segments comprise an array of the openings, wherein the array comprises a plurality of rows and a plurality of columns.

In some embodiments, at least a subset of the cells are enclosed by a plurality of segments of the intersecting walls, wherein the plurality of segments for each cell comprises at least a first wall segment and a second wall segment, wherein both of the first wall segment and the second wall segment each comprise at least one of the openings, and wherein the at least one opening in the first wall segment is not axially aligned with any of the openings in the second wall segment.

In some embodiments, the at least one opening in the first wall segment comprises a first set of openings that are axially-spaced from each other along the first wall segment, wherein the at least one opening in the second wall segment comprises a second set of openings that are axially-spaced from each other along the second wall segment, and wherein the first set of openings are axially aligned with respect to the second set of openings.

In some embodiments, the at least one opening in the first wall segment comprises a first set of openings that are axially-spaced from each other along the first wall segment, wherein the at least one opening in the second wall segment comprises a second set of openings that are axially-spaced from each other along the second wall segment, and wherein the first set of openings are axially offset with respect to the second set of openings.

In some embodiments, a cross-sectional shape of the cells in the subset of cells is rectangular, and the first wall segment and the second wall segment are oppositely disposed sides.

In some embodiments, a first axial distance between at least a first adjacent pair of axially-spaced openings is not equal to a second axial distance between at least a second adjacent pair of axially-spaced openings.

In some embodiments, the heater body is arranged as a disc.

In some embodiments, a fluid treatment system comprises the heater assembly of any one of the preceding paragraphs and a ceramic honeycomb body in fluid communication with each other.

In some embodiments, the ceramic honeycomb body is arranged as a catalyst substrate or a particulate filter.

In some embodiments, the fluid treatment system is an exhaust aftertreatment system.

In some embodiments, a method of treating a fluid with the fluid treatment system of any of the preceding paragraphs comprises applying a voltage potential across the electrodes of the heater assembly to generate heat in the heater body as a result of current flowing through the current-carrying path between the electrodes; heating a gas flow with the heat generated by the heater body to increase a temperature of the gas flow; and then heating the ceramic honeycomb body with the gas flow.

In some embodiments, the ceramic honeycomb body comprises a catalytic material and heating the ceramic honeycomb body comprises initiating light off of the catalytic material to a temperature at which the catalytic material becomes catalytically active.

In some embodiments, a method of manufacturing a monolithic heater body for a heater assembly comprises: forming a plurality of intersecting walls, wherein the walls have a thickness and extend in an axial direction to form a plurality of cells of the honeycomb structure that extend axially from a first end face to a second end face; and forming a plurality of openings that extend through the thickness of at least some of the walls.

In some embodiments, the method comprises coupling a first electrode to the heater body and coupling a second electrode to the heater body to create a current-carrying path over the intersecting walls between the first and second electrodes.

In some embodiments, the method comprises forming one or more insulating slots that extend laterally into the heater body, wherein the insulating slots disrupt flow of current to cause the current-carrying path to take a serpentine shape.

In some embodiments, the intersecting walls and the plurality of openings are formed concurrently by an additive manufacturing process.

In some embodiments, the additive manufacturing process comprises three-dimensional printing.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
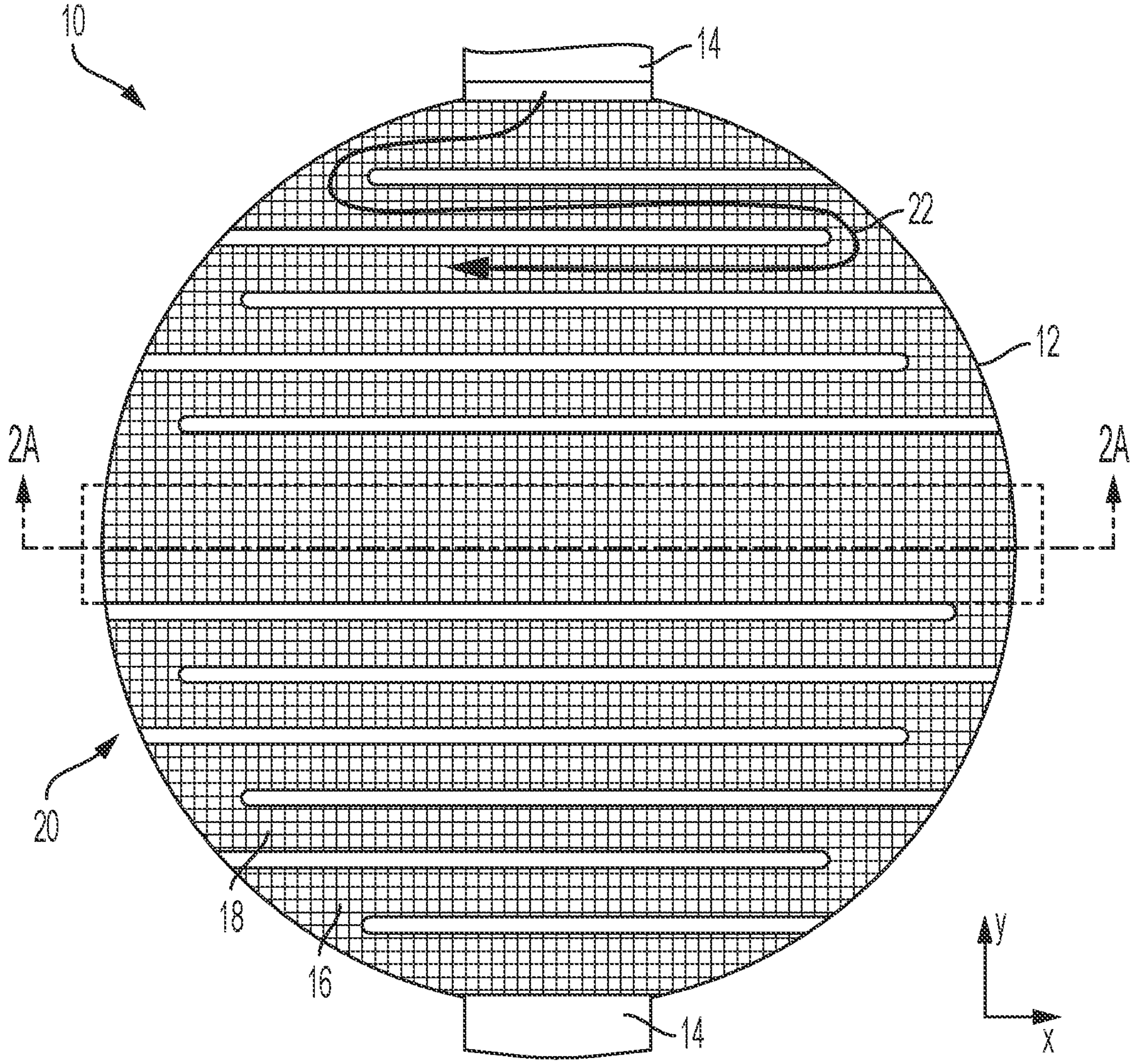
FIG. 1 illustrates an end face of a heater assembly accordingly to one embodiment disclosed herein.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Modifications of the disclosure will occur to those skilled in the art and to those who make or use the disclosure. Therefore, it is understood that the embodiments shown in the drawings and described herein are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to also include the specific value or end-point referred to.

Directional terms as used herein for example up, down, right, left, front, back, top, bottom—are made only with reference to the figures as drawn and are not intended to imply absolute orientation.

Catalytic systems for the aftertreatment of engine exhaust gases can achieve temperatures sufficient for activation of the catalytic material (i.e., "light off") via passive heating of the catalytic material from the heat of the exhaust gas being treated. Alternatively, electrically heated catalyst (EHC) systems use an active heating approach where the catalyst temperature is raised in part by the supply of electric power, e.g., to directly heat a catalyst-loaded substrate and/or to heat a separate heater in fluid communication with a catalyst-loaded substrate. For example, an EHC system can comprise a heater, such as a resistive heater, in fluid communication with the catalyst substrate, or the catalyst substrate can comprise an electrically conductive material and be supplied directly with an electrical power source to cause resistance heating of the walls of the substrate. Electric power in an EHC system can also be useful for types of heating other than resistance heating, such as induction heating.

Heaters in an EHC system, in particular resistance heaters, can be arranged having a generally honeycomb pattern of intersecting walls that define an array of cells extending axially between opposite faces of the heater. The material of the walls can be conductive, e.g., a metal, conductive ceramic, or composite material, such that the conductive walls undergo resistance (Joule) heating when a current is flowed through the walls, e.g., between a pair of electrodes coupled to the heater.

A heater can comprise a honeycomb structure of intersecting walls that define an array of cells extending in the axial (longitudinal) direction. According to embodiments disclosed herein, the heater comprises openings laterally through the axially-extending surfaces of the walls. In other words, the openings are directed through the walls transverse, e.g., perpendicular, to the axial direction. As described herein, these openings advantageously reduce the mass of the heater, which can be useful to reduce the time required for the heater to reach its maximum temperature. Furthermore, by reducing the amount of material in the walls, the openings also increase the resistance over the current-carrying path through the walls, which advantageously enables the total length of the current-carrying path to be reduced. For example, by increasing the resistance of the walls, and thereby reducing the necessary length of the current-carrying path, the thickness of the walls can be increased and/or fewer, smaller, or shorter laterally-extending insulating slots can be implemented, which results in the overall strength of the heater being increased. Increased strength can be particularly advantageous when the heater is used in an EHC system for the aftertreatment of engine exhaust gases, as such heaters may be required to survive harsh environments and repeated temperature cycling over many years. Additionally, the openings, which are generally transverse to the direction of gas flow through the heater (i.e., transverse to the axial direction through the heater), advantageously act to break up the air flow across the wall, thereby increasing the interaction between the gas flow and the walls, which improves heat transfer to the gas flow.

Referring now to FIG. 1, a heater assembly 10 is illustrated comprising a heater body 12 connected between a pair of electrodes 14. Each of electrodes 14 can be arranged as, or comprising, one or more electrically-conductive components, such as an electrical lead, wire, rod, plate, or other electrical connector. The electrodes 14 (or portions thereof) can be coupled to the heater body 12 in any suitable manner, such as by being integrally (monolithically) formed with the intersecting walls 16, e.g., via the same additive manufacturing process, or affixed or connected to the heater body 12 as separate components. The heater body 12 comprises a monolithic (single, integrally-formed component) honeycomb structure formed by a plurality of intersecting walls 16, which define a plurality of cells 18 extending axially through the heater body. By forming the walls 16 from an electrically conductive material (such as a metal or conductive ceramic), the walls 16 will undergo resistance heating upon application of a voltage across the electrodes 14. Axes x, y, and z for a Cartesian coordinate system are included, as applicable, in FIGS. 1-3 to assist in indicating the orientation of these FIGS. and the components thereof relative to each other.

Figure 3:
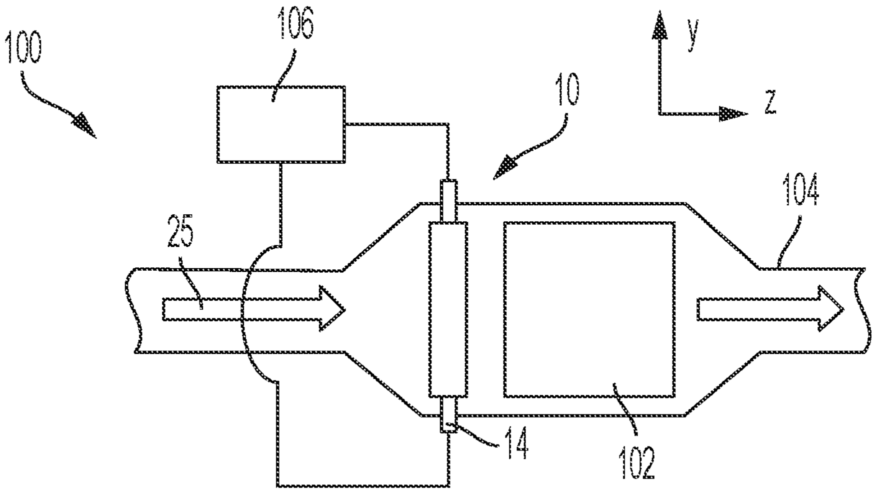
FIG. 3 schematically shows a fluid treatment system, e.g., an exhaust aftertreatment system, comprising a heater assembly according to one embodiment disclosed herein.

In accordance with the disclosure herein, the heater assembly 10 can be included as part of a fluid treatment system, such as an exhaust aftertreatment system 100 shown in FIG. 3. In this embodiment, the heater assembly 10 is arranged in fluid communication with a catalyst-loaded body 102 (e.g., a catalyst loaded substrate of a catalytic converter) within exhaust piping 104. In some embodiments, the body 102 is arranged as a particulate fitter comprising a plugged honeycomb body. For example, the body 102 can comprise a porous ceramic honeycomb body loaded with one or more catalytic materials. As described herein, the heater assembly 10 can be arranged to provide heat to initiate light-off of the catalytic material loaded onto the body 102. The heater assembly 10 can also assist in other processes, such as particulate filter regeneration.

As shown in FIG. 3, the electrodes 14 can be connected to a power source 106 to provide the electrical energy necessary for the heater assembly 10 to operate. For example, the heater assembly 10 can be arranged to heat a gas flow 25 (illustrated as arrows), e.g., an exhaust flow from an internal combustion engine, to a temperature sufficient to initiate light-off when the gas flow 25 heats up the body 102 as the gas flow 25 flows through the body 102. In some embodiments, the heater assembly 10 is arranged to heat the gas flow 25 to a temperature of at least 800° C., at least 900° C., or even 1000° C. Additionally and/or alternatively, the heater body 12 can be positioned relative to the body 102 (e.g., upstream or downstream) to provide radiative heating to the body 102.

The resistance (R) of the heater body 12 depends on geometrical and material parameters of the walls 16 through which the current passes. Accordingly, in order to assist in obtaining an electrical resistance, the walls 16 of the heater body 12 can be arranged in a pattern, e.g., including areas in which there are no walls over which to carry current, to set a length of a current-carrying path 22 between the electrodes 14. For example, as shown in FIG. 1, the heater body 12 comprises a plurality of insulating slots 20 that extend laterally (in the indicated x-direction) across the heater body 12. For example, the insulating slots 20 can be formed by an absence of the intersecting walls, i.e., gaps in which there are none of the intersecting walls 16. Alternatively or additionally, the slots 20 can be filled with an electrically insulating material, such as a non-conductive ceramic or other material.

In this way, the slots 20 disrupt the flow of current between the electrodes 14. That is, the slots 20 thereby cause the current, which would travel in essentially a straight line (in the indicated y-direction) between the electrodes 14 if the insulating slots 20 were not present, to instead also traverse laterally (in the indicated x-direction) back-and forth across the heater body 12 in a serpentine pattern for the current-carrying path 22 (only a portion indicated in FIG. 1). In this way, the number, length, and width of the slots 20 can accordingly be selected to set a heater body resistance by varying the length of the current-carrying path 22. In FIG. 1, there are thirteen of the slots 20, which alternatingly extend laterally into the heater body 12 from opposite sides. Any number of the slots 20 can be included to set the total length of the current-carrying path 22.

Figure 2A:
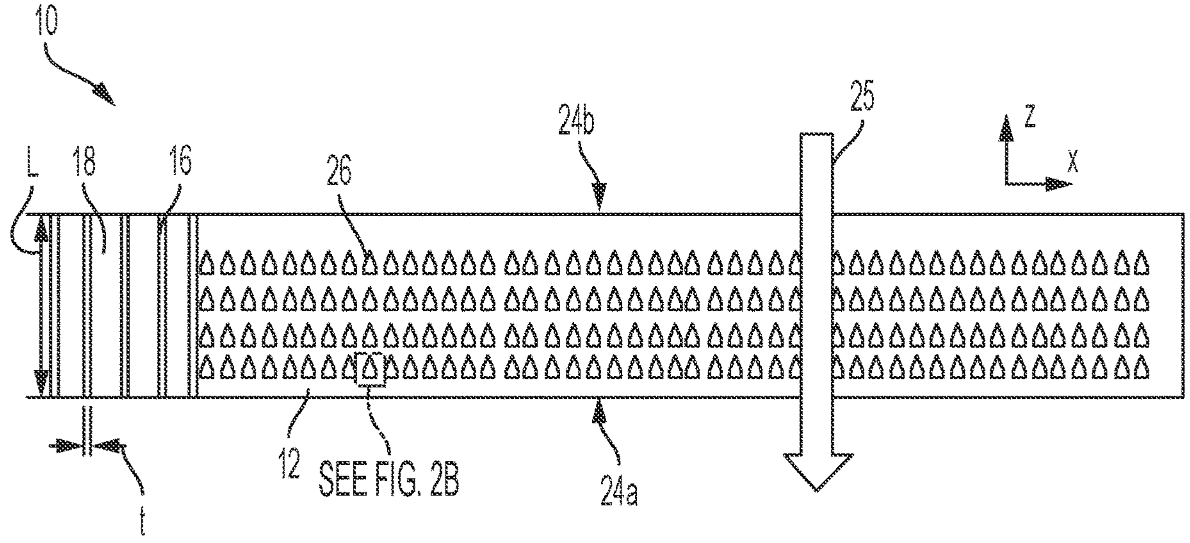
FIG. 2A. is a cross-sectional view of the heater assembly of FIG. 1 taken generally along line 2A-2A showing a plurality of openings formed through intersecting walls of the heater assembly.

FIG. 2A is a cross-sectional view of the heater body 12 taken laterally through and along a centermost one of the slots 20. Since the cross-section is taken along the length of the slots 20 (where there are no intersecting walls 16), the walls 16 and cells 18 are only shown in cross-section in FIG. 2A at the end of the slot 20 (toward the left-hand side of the heater body 12 with respect to the orientation of FIG. 2A). The walls 16 have a thickness 't' (in both the x- and y-directions, while only the x-direction shown in the orientation of FIG. 2A). As shown in FIG. 2A, the heater body 12 has an axial length L (in the z-direction) that extends axially between opposite end faces 24*a* and 24*b* (which may be collectively referred to herein as the "end faces 24"). A representative flow of gas 25 is represented in FIG. 2A directed axially (z-direction) from the first end face 24*a* to the second end face 24*b*, such that the first end face 24*a* can be considered as an inlet or upstream end face and the end face 24*b* can be considered as an outlet or downstream end face. Thus, when the heater assembly 10 is in operation, the axial direction of the heater body 12 corresponds to the direction of the gas flow 25, and also to the z-direction of the coordinate system indicated in FIGS. 1-3.

Figure 2B:
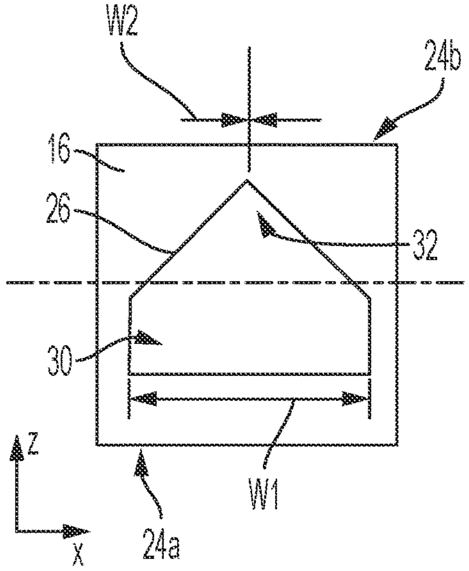
FIG. 2B is an enlarged view of the area generally indicated in FIG. 2A showing one of the openings in more detail.
Figure 2C:
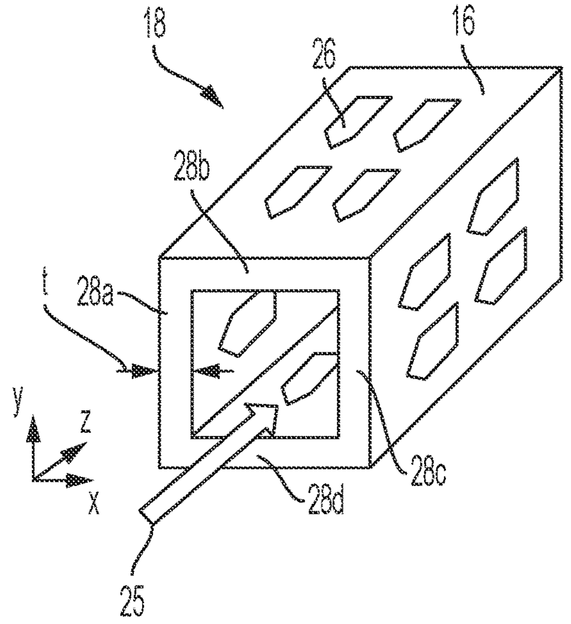
FIG. 2C schematically illustrates a single cell formed from a plurality of segments of the intersecting walls of a honeycomb structure for a heater assembly according to one embodiment disclosed herein.

As shown in FIG. 2A, and in further detail in the enlarged views of FIG. 2B and FIG. 2C, the heater body 12 comprises openings 26 in the walls 16. More particularly, the openings 26 are formed in the axially-extending surfaces of the walls 16 (surfaces that extend in the z-direction, e.g., having the axial length L as shown in FIG. 2A), and thus the openings 26 perforate or penetrate through the thickness t of the walls 16 (in the x- and y-directions). In other words, the openings 26 extend through the walls 16 in a direction (e.g., x- or y-direction) perpendicular to the axial direction (e.g., z-direction), and thus the openings 26 are directed through the walls 16 in a direction perpendicular to the direction (z-direction) of the gas flow 25.

In the embodiment of FIG. 2A, a few of the outermost cells 18 (near the outer circumference of the heater body 12) do not comprise the openings 26. More particularly, due to the current preferentially flowing through the shortest possible path, the outermost cells do not contribute significantly to heating, so the walls 16 proximate to the outer periphery can be kept solid (no openings 26) to increases the strength of the heater body 12 without significantly affecting the heating performance.

Any number of the openings 26 can be formed in the walls 16 defining each of the cells 18. For example, FIG. 2C schematically illustrates a single one of the cells 18, which in the illustrated embodiment is defined by four webs or segments 28*a*-28*d* of the walls 16 intersecting at corners in a square shape. The wall segments 28*a*-28*d* are provided as one example only, and thus the wall segments in any embodiment (illustrated and non-illustrated) may be collectively and/or generally referred to as the wall segments 28. In alternate embodiments, the cells 18 could be circular or ellipsoidal (e.g., defined by a single continuous wall segment 28), triangular (e.g., defined by three wall segments 28), hexagonal (e.g., defined by six wall segments 28), octagonal (e.g., defined by eight wall segments 28), or any other shape.

Regardless of the shape of the cells 18, the segments of the walls 16 (e.g., segments 28*a*-28*d* of FIG. 2C) defining the cells 18 can have any number of the openings 26 formed therethrough. For example, in FIG. 2A each wall segment defining the cells 18 has eight total openings 26 in a two-by-four array (two columns and four rows). That is, the openings 26 in FIG. 2A arranged as an array of four rows (the rows spaced subsequently along the axial, or z direction) of two openings in each row for each wall segment. In FIG. 2C, each wall segment (28*a*-28*d*) has four total openings 26 in a two-by-two array, with the openings 26 in FIG. 2C arranged in two rows of two openings in each row for each wall segment 28*a*-28*d*. In some embodiments, at least some of the wall segments 28 have only a single opening 26, or only a single column of axially-spaced openings 26. In some embodiments, there is a higher density of openings 26 (number of openings 26 per unit surface area of the walls 16) in some regions (such as towards the center of the heater body 12), to increase the resistance, and thereby the heat generation, in those regions.

In some embodiments, each wall segment 28 has the same number of openings 26 formed therethrough, while in other embodiments different wall segments 28 have different numbers of the openings 26. For example, in some embodiments, such as shown in FIG. 2A, the walls 16 proximate to the ends of the slots 20 (through which the current flows to define the serpentine pattern for the current-carrying path 22) comprise a fewer number of the openings 26 therein (such as no openings 26), in comparison to segments of the walls 16 that are aligned along the length of the slots 20.

In some embodiments, the openings 26 are all of the same size and/or shape throughout each wall segment 28 and/or throughout the entirety of the heater body 12. In some embodiments, the openings 26 are different sizes and/or shapes in different wall segments 28, such as determined by different locations within the heater body 12. In some embodiments, the wall segments 28 extending parallel to the lateral direction of slots 20 (e.g., the wall segments extending in the x-direction, such as the wall segments 28*b* and 28*d* in FIG. 2C) have a different arrangement of the openings 26 (e.g., different size, shape, orientation, pattern, and/or number) than the wall segments 28 that extend perpendicular to the lateral direction of the slots 20 (e.g., the wall segments extending in the y-direction, such as the wall segments 28*a* and 28*c* in FIG. 2C). For example, while FIG. 2C illustrates each of the wall segments 28 having the openings 26, in some embodiments, only the portion of the walls 16 extending in a direction parallel to the direction of the slots 20, i.e., the wall segments 28*b* and 28*d*, have the openings 26. In some embodiments, some of the openings 26 in a single wall segment 28 are of a different size or shape than other openings 26 in that wall segment 28. In some embodiments, the wall segments 28 defining adjacent cells 18 alternatingly have different numbers, shapes, sizes, patterns, or orientations of the openings 26.

The openings 26 are shown in FIGS. 1-2C having a generally pentagonal (5-sided) shape, although other shapes are possible, such as circles, ellipses, rectangles, squares, triangles, and other polygons, including combinations of these shapes. However, as discussed further herein, the current inventors have found that shapes similar that are relatively wider (have a larger lateral dimension, such as in the x-direction or y-direction) at the downstream side than at the upstream side (relative to the direction of the gas flow 25), provide unexpectedly superior results. For example, as shown in FIGS. 2A, 2C, and 5A-5C, the heater assembly 10 is oriented relative to the gas flow 25 such that the tapered tips of the pentagonal shaped openings 26 are pointing into the gas flow 25. In other words, the tapered tips of the pentagonal shaped openings 26 are aimed in a direction that is opposite to that of the direction of the gas flow 25 rotated by 180° relative to each other). Furthermore, pentagonal or other shapes having tapered ends are particularly suitable for forming a monolithic honeycomb structure using in additive manufacturing processes, such as powder bed fusion or other three dimensional printing process, as the tapered shape generally provides an incrementally increasing amount of support for each subsequently printed layer during the printing process.

One example shape for the opening 26 is shown in FIG. 2B, with the opening 26 having a first lateral dimension (e.g., first width) W1 at an upstream side 30 of the opening 26 that is larger than a second lateral dimension (e.g., second width) W2 at a downstream side 32 of the opening 26. In this example, the second dimension W2 approximates a single point at which the tapered edges of the pentagon shape meet, although in other embodiments the second dimension W2 can be larger than a single point (such as in a trapezoidal shape, as shown in the example of FIG. 4C).

Alternatively to measuring the specific lateral dimensions at the axial extremes of the upstream and downstream edges of its shape, the opening 26 in some embodiments has a shape that has a larger flow-through area in the upstream half of the shape than the flow-through area in the downstream half of the shape. Alternatively and/or additionally, in some embodiments a maximum lateral dimension (e.g., in the x-direction or y-direction) of the shape of the opening 26 is located in the upstream half of the shape, and the shape tapers toward the downstream side from that maximum dimension. For example, in some embodiments the shape of the opening 26 is curved at the upstream side 30 and then tapered toward the downstream side 32, e.g., such as a teardrop shape (see the example of FIG. 4D). For example, it can be seen in FIG. 2B with respect to a center line drawn at the axial midpoint between the upstream side 30 and the downstream side 32, that the shape of the opening 26 has a larger area in upstream half of the shape (axially from the upstream side 30 to the center line) than the downstream half of the shape (axially from the center line to the downstream edge 32). Additionally, the maximum lateral dimension (in the example of FIG. 2B, this is the dimension W1) is located in the upstream half of the shape, which then tapers in the downstream half of the shape.

Figure 4A:
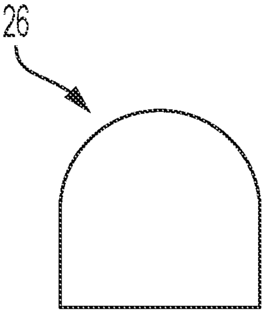
FIGS. 4A-4D illustrate alternate shapes for the openings in the intersecting walls according to various embodiments disclosed herein.
Figure 4B:
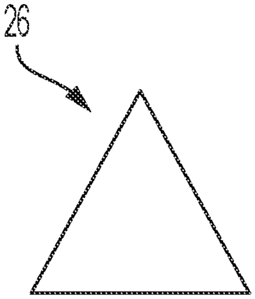
Figure 4C:
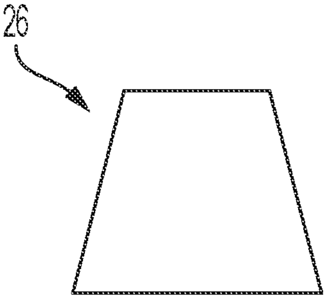
Figure 4D:
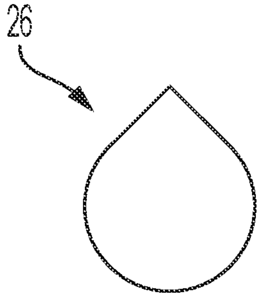

Examples of additional shapes for the openings 26 are shown in FIGS. 4A-4D, such as an archway shape in FIG. 4A (circular at the downstream side 32 and rectangular at the upstream side 30), a triangular shape in FIG. 4B, a trapezoidal shape in FIG. 4C, and a teardrop shape in FIG. 4D. In each of these examples, the maximum lateral dimension is in the upstream half of the shape, such that the there is a greater flow-through area of the shape toward the upstream side than the downstream side.

Figure 5A:
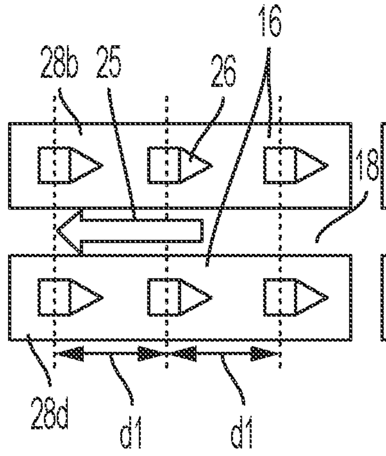
FIGS. 5A-5C show various patterns for arranging the openings ire the intersecting walls according to various embodiment disclosed herein.
Figure 5B:
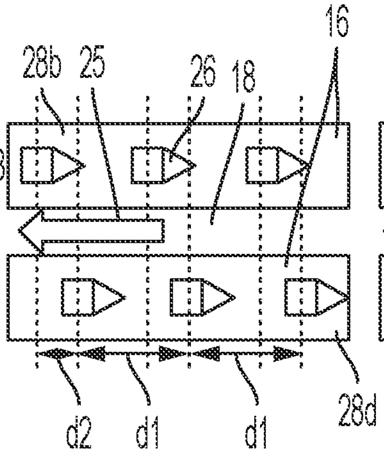
Figure 5C:
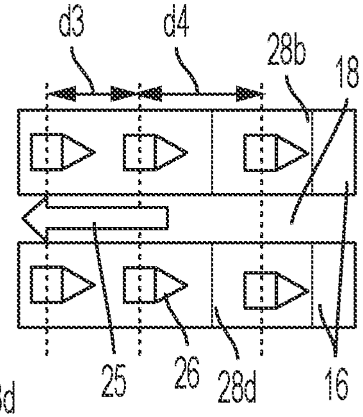

While the openings 26 in each row of the embodiments of FIGS. 2A and 3 are generally aligned and equally spaced along the axial direction, the openings 26 can be arranged in other patterns, such as described with respect to FIGS. 5A-5C. More particularly, each of FIGS. 5A-5C shows two different walls of the same cell 18, such as the oppositely-disposed walls 28*b* and 28*d* of FIG. 2C (the other two wall segments interconnected between the wall segments 28*b* and 28*d* are not shown). However, the patterns for the openings 26 described herein are not limited to oppositely disposed walls, such that patterns described herein are applicable to any set of two or more different wall segments, such as different wall segments of the same cell or different cells. Additionally, instead of different wall segments, the patterns described herein are also applicable to different columns of openings 26 in the same wall segment 28 (e.g., the pair of axially adjacent columns of openings in each of the wall segments of FIG. 2C).

Accordingly, FIG. 5A shows an embodiment having a pattern similar to that of FIGS. 2A and 3 in which the openings 26 in each of the walls are axially aligned. For example, alignment of the openings 26 in FIG. 5A can be determined with respect to reference lines indicated in a common location on each of the openings 26. That is, each of the openings 26 in FIGS. 5A-5C is illustrated in a pentagon shape as a combination of a rectangular base and a tapered triangular tip, with a centerline illustrated for each of the rectangular bases. As shown in FIG. 5A, the openings 26 are axially aligned, such that the centerlines of the shape of the openings 26 are colinear. Additionally in FIG. 5A, the openings 26 are consistently axially spaced along the wall segment 28. For example, in FIG. 5A the axial distances between the leftmost and middle openings 26 and between the middle and rightmost openings 26 are the same, and thus, both spacings are indicated as having an axial distance d1.

FIG. 5B shows another embodiment in which the openings 26 in different wall segments 28 of the cells 18, such as the oppositely-disposed wall segments 28*b* and 28*d* defining a rectangular or square cell, are axially staggered. For example, in FIG. 5B, the openings 26 in the wall segment 28*b* are axially misaligned or axially staggered with respect to the openings 26 in the wall segment 28*d*, as indicated in FIG. 5B by the centerlines not being colinear. Instead, each of the openings 26 in the wall segment 28*d* is spaced by an axial distance d2 from the openings 26 in the wall segment 28*b*. However, similar to FIG. 5A, the openings 26 in each of the wall segments 28 of the embodiment of FIG. 5B are consistently spaced from each other by the consistent axial distance d1.

FIG. 5C shows another embodiment in which the axial spacing between axially-adjacent openings 26 is variable along the length of the wall segment 28. For example, FIG. 5C shows an example in which the first pair of axially-adjacent openings 26 is separated by a first axial distance d3 and the second pair of axially-adjacent openings 26 is separated by a second axial distance d4 that is different than the distance d3. While the axial spacing between adjacent openings 26 is variable, similar to FIG. 5A, the openings 5A in both of the wall segments 28*b* and 28*d* are axially aligned, as indicated by the centerlines of the shapes of the openings 26 being colinear. In some embodiments, a combination of the embodiments of FIGS. 5B and 5C is arranged in which the spacing between axially adjacent openings 26 in each of the wall segments is variable, and in which the openings 26 in different walls segments 28 are axially misaligned from each other (i.e., the openings 26 in a first wall segment of a cell is axially misaligned or axially staggered with respect to the openings 26 in a second wall segment of that cell).

Arranging the openings 26 in a staggered pattern, as discussed with respect to FIG. SB can further assist in increasing the flow mixing. For example, the staggered, or axially offset openings 26, result in unequal pressure created by wall friction as the openings 26 are offset (FIG. 5B) compared to aligned holes (FIG. 5A). Additionally or alternatively, variable axial spacing (FIG. 5C), can be arranged to alter the flow mixing. For example, the openings 26 can be arranged in a pattern such that the upstream portion of the heater body 12 proximate to the upstream or inlet end face 24*a* has a lower density of openings 26 (fewer openings 26 per unit surface area of the walls 16, and/or, with respect to FIG. 5C, the distance d3 longer than the distance d4), and thereby offers higher flow cross-section area for the current at the upstream portion of the heater body 12, and hence slightly higher power can be achieved. In this way, the heat transfer effectiveness can be further improved and maximum temperature further reduced due to the enhanced transfer of heat to the gas flow.

The effect of the openings 26, as well as the shape and orientation of the openings 26 was investigated. In a first investigation, modeling was utilized to first determine the resistance and corresponding power output for a first heater assembly ("Example 1") of a given geometry formed generally in accordance with the honeycomb design described with respect to FIGS. 1 and 2A, but without the openings 26 in any of the intersecting walls. The resistance and output power from the first heater assembly ("Example 1") were then used as target parameters to next determine a corresponding geometry capable of achieving the same resistance and output power parameters for a second heater assembly ("Example 2") having eight of the openings 26 each wall segment along the length of the insulating slots (as shown in and described with respect to FIGS. 1 and 2A). Accordingly, the dimensions of the heater assembly of Example 2 were set to match the power output of Example 1. Each of the heater bodies in Examples 1 and 2 were modeled made of Inconel 625. Table 1 summarizes the targeted parameters, corresponding heater geometries, and additional resulting performance variables for the two modeled heaters, designated as Examples 1 and 2.

TABLE 1

Geometries Capable of Achieving Target Properties for Heaters With and Without Openings And Resulting Heater Performance Parameters

| | Heater Example 1 | Heater Example 2 |
|---|---|---|
| Openings: | None | Eight Openings per Cell Wall Segment |
| Target Variables: | | |
| Resistance (ohm) | 0.387 | 0.384 |
| Power (kW) @48 V | 5.94 | 5.98 |
| Geometry Capable of Achieving Target Properties: | | |
| Diameter (inch) × Axial Length (inch) | 3.1 × 0.21 | 3.1 × 0.256 |
| Cell Density/Wall Thickness (cpsi/mils) | 361/8 | 361/5.6 |
| Number of Lateral Insulating Slots | 17 | 13 |
| Thermal Mass of Heater Body (g) | 60 | 54 |
| Additional Resulting Heater Performance Parameters: | | |
| Total Surface Area, TSA ($m^2$) | 0.056 | 0.066 |
| Geometric Surface Area, GSA ($m^2/m^3$) | 2233 | 2084 |
| Mass Flow Channel (% of inlet flow) | 54 | 70 |
| Mass Flow Slot (% of inlet flow) | 46 | 30 |
| Average HTC ($W/m^2$-K) | 150 | 146 |
| Heat Transfer Effectiveness {Average HTC * TSA} (W/K) | 8.4 | 9.63 |
| Time Constant {mCp/(HTC * TSA)} (s) | 3.289 | 2.584 |

As summarized in Table 1, the heater body of Example 1 (heater assembly without the openings 26) was modeled with a cell density of approximately 361 cells per square inch (cpsi), a wall thickness (akin to the wall thickness t of FIG. 2A) of approximately 8 mils, seventeen laterally-extending insulating slots (akin to the slots 20 of FIG. 1), and an axial length (akin to the axial length L of FIG. 2A) of 0.21 inches. The mass of the heater body of Example 1 was approximately 60 g.

The design of Example 1 delivered approximately 6 kW of power when a 48V potential was applied across the electrodes (corresponding to a resistance of approximately 0.385 ohms). These parameters were used as target values in order to determine a geometry for Example 2 that comprised the openings 26 in its walls 16 and was capable of achieving these target parameters. As described herein, all other parameters held constant, inclusion of the openings 26 will increase the resistance of the heater. Accordingly, the target resistance and output power parameters were achieved in Example 2 by elongating the axial length (see axial length L of FIG. 2A) of the heater body of Example 2 with respect to this dimension in the heater body of Example 1. It is noted that alternatively a dimension other than axial length, such as the wall thickness (e.g., the wall thickness t of FIG. 2A) of the heater body in Example 2 could have been increased to achieve the same heater resistance as Example 1. Furthermore, the number of insulating slots (see insulating slots 20 of FIG. 1) was able to be reduced from seventeen in Example 1 to only thirteen in Example 2 due to the inclusion of the openings 26 reducing the cross-sectional area for the current-carrying path. As also summarized in Table 1, despite the increase in the axial length of the heater body of Example 2, the thermal mass was able to be reduced from 60 g in Example 1 to about 54 g in Example 2 while still achieving the target resistance and output power parameters.

The reduced thermal mass directly correlated to a faster heat up time for the heater assembly of Example 2, as indicated by the values of time constant in Table 1. The time constant values were calculated in units of seconds (s), as the thermal mass (mCp) divided by the product of the heat transfer effectiveness (HTC) and the total surface area (TSA), there the thermal mass is the product of the mass (m) and the heat capacity (Cp). In general, a smaller time constant value, as calculated in Table 1, indicates more energy transfer heating the gas flow, and thus, faster heat up of the gas flow.

As summarized in Table 1, it was found that the heat transfer effectiveness for the heater assembly of Example 2 was significantly increased with respect to Example 1, namely, as a result of better flow mixing enabled by the openings 26. The heat transfer effectiveness can be determined by multiplying the heat transfer coefficient (HTC) by the total surface area (TSA) of the walls 16 (i.e., HTC*TSA). The improved heat transfer effectiveness of Example 2 was enabled in part due to the openings 26 breaking up the formation of a boundary layer in the gas flow through the cells 18 and/or through the slots 20, and increasing the flow mixing of the gas flow between adjacent cells 18 and the slots 20 (flow from any given cell 18 and/or slot 20 can flow through the openings 26 into one or more adjacent cells 18 and/or slots 20). The presence of openings 26 also assists to redistribute flow away from the slots 20, such that up to 70% (by mass) of the gas flow went through the channels in Example 2 in comparison to only 54% in Example 1.

Figure 6A:
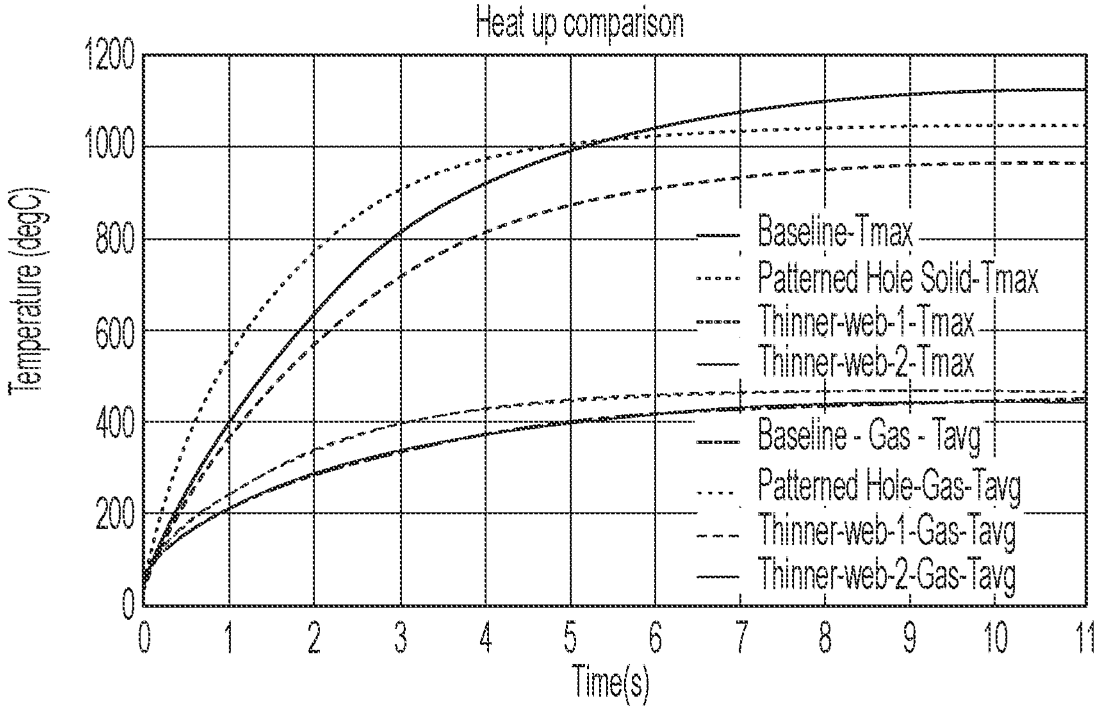
FIGS. 6A-6B are graphs illustrating the heat up performance for heater assemblies formed with and without openings in the intersecting walls according to various examples described herein.
Figure 6B:
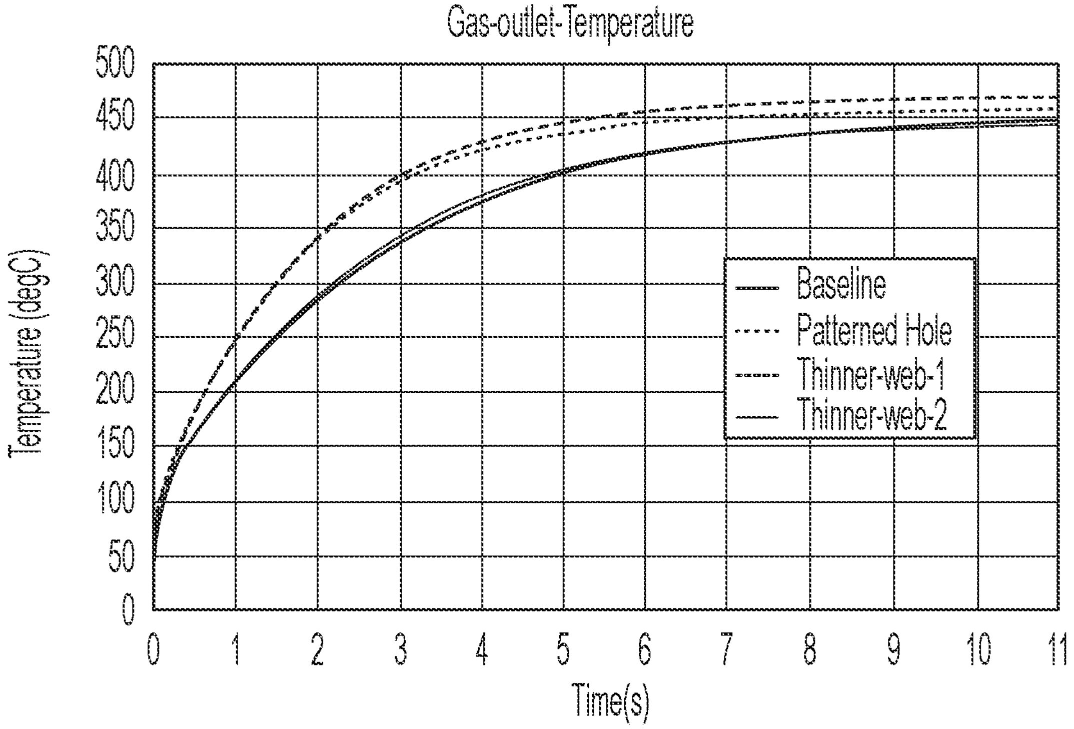

FIGS. 6A and 6B show the heat up comparison (temperature with respect to time) respectively for the temperature the heater body and the temperature of the flow of Eras (e.g., the gas flow 25). As shown in FIGS. 6A-6B, the heater assembly of Example 2 enabled the combined advantage of faster heater body heat up (e.g., due to the lower thermal mass) and gas flow heat up (e.g., due to the superior heat transfer between the heater and gas flow). Additionally, in order to prevent damage due to overheating, a target value of 1000° C. was set as the maximum temperature for the heaters, and this was achieved by the heater assembly of Example 2 at least in part due to its improved heat transfer effectiveness (flow mixing). In comparison, the heater assembly of Example 1 was slower to heat up both the heater body and the gas flow, and overshot the target maximum temperature due to its relative inability to transfer heat to the gas flow as effectively.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A heater assembly comprising:

a heater body comprising a monolithic honeycomb structure comprising a plurality of intersecting walls, wherein the plurality of intersecting walls have a thickness and extend in an axial direction to form a plurality of cells of the honeycomb structure that extend axially from a first end face to a second end face;

a first electrode coupled to the heater body;

a second electrode coupled to the heater body, wherein a current-carrying path is defined over the plurality of intersecting walls between the first electrode and the second electrode; and a plurality of openings that extend through the thickness of at least some of the plurality of intersecting walls, each of the openings defined by a shape having a downstream side and an upstream side, the upstream side positioned to encounter the flow of gas before the downstream side;

wherein, for each of the plurality of openings:

(i) a first lateral dimension measured at a downstream axial extreme of the downstream side is wider than a second lateral dimension measured at an upstream axial extreme of the upstream side, or (ii) a flow area of an entirety of a downstream axial half of the shape is larger than an entirety of an upstream axial half of the shape, or (iii) a maximum lateral dimension of the shape is located in the downstream axial half of the shape, and all lateral dimensions in the upstream axial half are less than the maximum lateral dimension, or (iv) a combination thereof, and wherein, each of the plurality of openings taper to a tip that points into an upstream direction, points away from the downstream side, and is positioned to point into the flow of gas and wherein the plurality of openings are arranged in a plurality of rows, each row comprising at least two of the plurality of openings arranged laterally, and the plurality of rows being axially spaced along the heater body.

2. The heater assembly of claim 1, further comprising a plurality of insulating slots that each extend laterally across at least a portion the heater body and disrupt the current-carrying path.

3. The heater assembly of claim 1, wherein a cross-sectional shape of each of the plurality of cells is square.

4. The heater assembly of claim 1, wherein each cell of the plurality of cells is enclosed by a plurality of segments of the plurality of intersecting walls, and wherein the heater body comprises a plurality of the openings in at least some of the plurality of segments of the plurality of walls that enclose each of the plurality of cells.

5. The heater assembly of claim 4, wherein at least some of the plurality of segments comprise a column of the plurality of openings axially-spaced along the at least some of the segments.

6. The heater assembly of claim 4, wherein at least two of the plurality of segments each comprise an array of the plurality of openings, wherein the array comprises the plurality of rows and a plurality of columns, and the at least two of the plurality of segments are generally parallel to each other and facing each other.

7. The heater assembly of claim 1, wherein at least a subset of the plurality of cells are enclosed by a plurality of segments of the plurality of intersecting walls, wherein the plurality of segments for each of the plurality of cells comprises at least a first wall segment and a second wall segment, wherein both of the first wall segment and the second wall segment each comprise at least one opening of the plurality of openings, and wherein the at least one opening in the first wall segment is not axially aligned with any of the at least one opening in the second wall segment.

8. The heater assembly of claim 1, wherein at least a subset of the plurality of cells are enclosed by a plurality of segments of the plurality of intersecting walls, wherein the plurality of segments for each of the plurality of cells comprises at least a first wall segment and a second wall segment, wherein both of the first wall segment and the second wall segment each comprise at least one opening of the plurality of openings, wherein the at least one opening in the first wall segment comprises a first set of openings that are axially-spaced from each other along the first wall segment, wherein the at least one opening in the second wall segment comprises a second set of openings that are axially-spaced from each other along the second wall segment, and wherein the first set of openings are axially aligned with respect to the second set of openings.

9. The heater assembly of claim 7, wherein the at least one opening in the first wall segment comprises a first set of openings that are axially-spaced from each other along the first wall segment, wherein the at least one opening in the second wall segment comprises a second set of openings that are axially-spaced from each other along the second wall segment, and wherein the first set of openings are axially offset with respect to the second set of openings.

10. The heater assembly of claim 7, wherein a cross-sectional shape of the plurality of cells in the subset of cells is rectangular, and the first wall segment and the second wall segment are oppositely disposed sides.

11. The heater assembly of claim 1, wherein a first axial distance between at least a first adjacent pair of axially-spaced openings is not equal to a second axial distance between at least a second adjacent pair of axially-spaced openings.

12. A fluid treatment system comprising the heater assembly of claim 1 and a ceramic honeycomb body in fluid communication with each other.

13. The fluid treatment system of claim 12, wherein the ceramic honeycomb body is arranged as a catalyst substrate or a particulate filter in an exhaust aftertreatment system.

14. A method of treating a fluid with the fluid treatment system of claim 12, comprising:

applying a voltage potential across the first and second electrodes of the heater assembly to generate heat in the heater body as a result of current flowing through the current-carrying path between the first and second electrodes;

heating a gas flow with the heat generated by the heater body to increase a temperature of the gas flow; and then heating the ceramic honeycomb body with the gas flow.

15. A method of manufacturing a monolithic heater body for a heater assembly, the method comprising:

forming a plurality of intersecting walls, wherein the plurality of walls have a thickness and extend in an axial direction to form a plurality of cells of the honeycomb structure that extend axially from a first end face to a second end face; and forming a plurality of openings that extend through the thickness of at least some of the plurality of walls, each of the openings defined by a shape having a downstream side and an upstream side;

wherein, for each of the plurality of openings:

(i) a first lateral dimension measured at a downstream axial extreme of the downstream side is wider than a second lateral dimension measured at an upstream axial extreme of the upstream side, or (ii) a flow area of an entirety of a downstream axial half of the shape is larger than an entirety of an upstream axial half of the shape, or (iii) a maximum lateral dimension of the shape is located in the downstream axial half of the shape, and all lateral dimensions in the upstream axial half are less than the maximum lateral dimension, or (iv) a combination thereof, and wherein each of the plurality of openings taper to a tip that points into an upstream direction and away from the downstream side and wherein the plurality of openings are arranged in a plurality of rows, each row comprising at least two of the plurality of openings arranged laterally, and the plurality of rows being axially spaced along the heater body.

16. A heater assembly comprising:

a heater body comprising a monolithic honeycomb structure comprising a plurality of intersecting walls, wherein the plurality of intersecting walls have a thickness and extend in an axial direction to form a plurality of cells of the honeycomb structure that extend axially from a first end face to a second end face;

a first electrode coupled to the heater body;

a second electrode coupled to the heater body, wherein a current-carrying path is defined over the plurality of intersecting walls between the first electrode and the second electrode; and a plurality of openings that extend through the thickness of at least some of the plurality of intersecting walls, each of the openings defined by a shape having a downstream side and an upstream side, the upstream side positioned to encounter the flow of gas before the downstream side;

wherein, for each of the plurality of openings:

(i) a first lateral dimension measured at a downstream axial extreme of the downstream side is wider than a second lateral dimension measured at an upstream axial extreme of the upstream side, or (ii) a flow area of an entirety of a downstream axial half of the shape is larger than an entirety of an upstream axial half of the shape, or (iii) a maximum lateral dimension of the shape is located in the downstream axial half of the shape, and all lateral dimensions in the upstream axial half are less than the maximum lateral dimension, or (iv) a combination thereof, and wherein, each of the plurality of openings tapers to a tip that points into an upstream direction, points away from the downstream side, and is positioned to point into the flow of gas, and wherein a first axial distance between at least a first adjacent pair of axially-spaced openings is not equal to a second axial distance between at least a second adjacent pair of axially-spaced openings.

* * * * *